US012279645B2

(12) United States Patent
Spencer

(10) Patent No.: US 12,279,645 B2
(45) Date of Patent: Apr. 22, 2025

(54) FLAVOR DELIVERY DEVICE

(71) Applicant: NICOVENTURES TRADING LIMITED, London (GB)

(72) Inventor: Alfred Vincent Spencer, London (GB)

(73) Assignee: NICOVENTURES TRADING LIMITED, London (GB)

( * ) Notice: Subject to any disclaimer, the term of this patent is extended or adjusted under 35 U.S.C. 154(b) by 966 days.

(21) Appl. No.: 16/076,711

(22) PCT Filed: Feb. 13, 2017

(86) PCT No.: PCT/GB2017/050375
§ 371 (c)(1),
(2) Date: Aug. 9, 2018

(87) PCT Pub. No.: WO2017/141017
PCT Pub. Date: Aug. 24, 2017

(65) Prior Publication Data

US 2019/0045837 A1 Feb. 14, 2019

(30) Foreign Application Priority Data

Feb. 18, 2016 (GB) ..................................... 1602831

(51) Int. Cl.
*A24B 15/167* (2020.01)
*A24D 1/00* (2020.01)
(Continued)

(52) U.S. Cl.
CPC ............ *A24F 40/30* (2020.01); *A24B 15/167* (2016.11); *A24D 1/002* (2013.01); *A24F 40/42* (2020.01);
(Continued)

(58) Field of Classification Search
None
See application file for complete search history.

(56) References Cited

U.S. PATENT DOCUMENTS 8,881,737 B2 * 11/2014 Collett .................... A24F 40/46 131/273
2004/0129280 A1 7/2004 Woodson
(Continued)

FOREIGN PATENT DOCUMENTS

CN 101390659 A 3/2009
CN 202890455 U * 4/2013
(Continued)

OTHER PUBLICATIONS

Russian Decision to Grant, Application No. 2018129850, dated Mar. 26, 2019, 16 pages.
(Continued)

*Primary Examiner* — Phu H Nguyen
(74) *Attorney, Agent, or Firm* — WOMBLE BOND DICKINSON (US) LLP

(57) ABSTRACT

A flavor delivery device for adding flavor to an aerosol stream generated by a smoking article includes an electrical heating element configured for connection to an electrical power source; and a portion of flavorant provider arranged to receive heat from the heating element, the flavorant provider including flavorant material held in a substrate material, the flavorant material able to form a vapor and the substrate material softenable under the application of heat, such that provision of electrical power to the heating element delivers heat to the flavorant provider to soften at least part of the substrate material and release at least some of the flavorant material as a vapor. The smoking article may be an electronic aerosol provision system or a combustible smoking article.

10 Claims, 4 Drawing Sheets

(51) Int. Cl.

| | |
|---|---|
| ***A24F 40/30*** | (2020.01) |
| ***A24F 40/42*** | (2020.01) |
| ***A24F 40/465*** | (2020.01) |
| ***A24F 40/50*** | (2020.01) |
| ***A24F 40/65*** | (2020.01) |
| ***H05B 1/02*** | (2006.01) |
| *A24F 40/10* | (2020.01) |
| *A24F 40/20* | (2020.01) |
| *A24F 40/60* | (2020.01) |

(52) U.S. Cl.

CPC ............ *A24F 40/465* (2020.01); *A24F 40/50* (2020.01); *A24F 40/65* (2020.01); *H05B 1/0297* (2013.01); *A24F 40/10* (2020.01); *A24F 40/20* (2020.01); *A24F 40/60* (2020.01)

(56) References Cited

U.S. PATENT DOCUMENTS

| | | | | |
|---|---|---|---|---|
| 2005/0016549 | A1 | 1/2005 | Banerjee et al. | |
| 2007/0062548 | A1 | 3/2007 | Horstmann | |
| 2007/0267033 | A1 | 11/2007 | Mishra | |
| 2008/0017206 | A1 | 1/2008 | Becker | |
| 2009/0320863 | A1 | 12/2009 | Fernando et al. | |
| 2012/0006346 | A1 | 1/2012 | Inagaki | |
| 2013/0340750 | A1 | 12/2013 | Thorens | |
| 2014/0035448 | A1 | 2/2014 | Tolentino | |
| 2014/0060554 | A1 | 3/2014 | Collett | |
| 2014/0088044 | A1 | 3/2014 | Rigas | |
| 2014/0299141 | A1* | 10/2014 | Flick | H05B 1/0202 131/329 |
| 2014/0301721 | A1 | 10/2014 | Ruscio | |
| 2014/0305448 | A1 | 10/2014 | Zuber | |
| 2014/0345606 | A1 | 11/2014 | Talon | |
| 2014/0345633 | A1 | 11/2014 | Talon | |
| 2015/0163859 | A1 | 6/2015 | Schneider | |
| 2015/0208727 | A1 | 7/2015 | Kuczaj | |
| 2015/0237916 | A1 | 8/2015 | Farine | |
| 2015/0241393 | A1* | 8/2015 | Ganti | G01N 29/09 73/589 |
| 2015/0272225 | A1* | 10/2015 | Worm | A24F 40/40 131/328 |
| 2015/0282525 | A1 | 10/2015 | Plojoux | |
| 2016/0007648 | A1 | 1/2016 | Sutton | |
| 2016/0021934 | A1* | 1/2016 | Cadieux | A24F 40/40 131/328 |

FOREIGN PATENT DOCUMENTS

| | | | |
|---|---|---|---|
| CN | 103519348 | | 1/2014 |
| CN | 103689812 | A | 4/2014 |
| CN | 103929988 | A | 7/2014 |
| CN | 203748680 | U | 8/2014 |
| CN | 104382236 | A | 3/2015 |
| CN | 104382238 | A | 3/2015 |
| CN | 204191581 | U | 3/2015 |
| CN | 104768407 | A | 7/2015 |
| CN | 204466899 | U | 7/2015 |
| CN | 104957776 | A | 10/2015 |
| CN | 105307524 | A | 2/2016 |
| EA | 19736 | | 5/2014 |
| EP | 2493342 | B1 | 12/2014 |
| EP | 2921065 | | 9/2015 |
| EP | 2921066 | | 9/2015 |
| JP | H 05153946 | | 6/1993 |
| JP | 2013509160 | A | 3/2013 |
| JP | 2014525237 | A | 9/2014 |
| KR | 100385395 | B1 | 8/2003 |
| KR | 20140070543 | A | 6/2014 |
| RU | 76781 | | 10/2008 |
| RU | 2687765 | C1 | 5/2019 |
| WO | WO-9527411 | A1 | 10/1995 |
| WO | WO2007036814 | | 4/2007 |
| WO | WO2011050964 | | 5/2011 |
| WO | WO2014095701 | | 6/2014 |
| WO | WO 2012/085205 | | 7/2014 |
| WO | WO2014118286 | | 8/2014 |
| WO | WO2014139609 | | 9/2014 |
| WO | WO2015082649 | | 6/2015 |
| WO | WO2015082651 | | 6/2015 |
| WO | WO2015150068 | | 10/2015 |

OTHER PUBLICATIONS

International Search and Written Opinion, Application No. PCT/GB2017/050375, mailed May 9, 2017, 17 pages.

International Preliminary Report on Patentability, Application No. PCT/GB2017/050375, mailed Jan. 26, 2018, 7 pages.

Japanese Decision to Grant, Application No. 2018-540163, dated Nov. 5, 2019, 3 pages.

Office Action dated Jul. 22, 2020 for Chinese Application No. 201780011178.8, 33 pages.

Office Action mailed Jul. 2, 2020 for Korean Application No. 10-2020-7013009, 10 pages.

Office Action dated Oct. 11, 2021 for Chinese Application No. 201780011178.8, 10 pages.

* cited by examiner

FLAVOR DELIVERY DEVICE

PRIORITY CLAIM

The present application is a National Phase entry of PCT Application No. PCT/GB2017/050375, filed Feb. 13, 2017, which claims priority from GB Patent Application No. 1602831.8, filed Feb. 18, 2016, each of which is hereby fully incorporated herein by reference.

TECHNICAL FIELD

The present disclosure relates to a flavor delivery device for use with smoking articles including electronic aerosol provision systems and combustible smoking articles.

BACKGROUND

Combustible smoking articles such as cigarettes, cigars and cigarillos are often based on the combustion of tobacco, although other plant material may be used, such as herbs. While the basic taste, flavor and scent of the tobacco or plant material may be provided as the overall flavor of the article to be perceived by the consumer during smoking, it is known to add additional flavorants to alter the delivered flavor, for example menthol. Various configurations for incorporating flavorants are known, including flavor released as a vapor into the inhaled airstream by the action of heat when the smoking article is lit for smoking or by the rupture of capsules under pressure of the consumer's hand or mechanical action of tearing a tape.

More recently, the provision of flavors has been carried over from combustible smoking articles into aerosol provision systems such as electronic cigarettes. Electronic cigarettes generally contain a reservoir of a source liquid containing a formulation, typically including nicotine, or a solid, such as a tobacco-based product, from which an aerosol is generated, such as through heat vaporization or other means. Thus an aerosol source for an aerosol provision system may comprise a heating element coupled to a portion of the source liquid from the reservoir. When a user inhales on the device, the heating element is activated to vaporize a small amount of the source liquid, which is thus converted to an aerosol for inhalation by the user. More particularly, such devices are usually provided with one or more air inlet holes located away from a mouthpiece of the system. When a user sucks on the mouthpiece, air is drawn through the inlet holes and past the aerosol source. There is an air flow path connecting the inlet holes to the aerosol source and on to an opening in the mouthpiece so that air drawn past the aerosol source continues along the flow path to the mouthpiece opening, carrying some of the aerosol from the aerosol source with it. The aerosol-carrying air exits the aerosol provision system through the mouthpiece opening for inhalation by the user. Incorporation of flavorants into such systems is straightforward; a flavorant can be included in the source liquid so that the generated aerosol includes volatile flavor elements vaporized by the heating of the heating element. A wide range of flavors is available, so that in some cases an electronic cigarette may deliver no conventional tobacco taste at all, but rather a taste composed solely of other flavors. Some systems allow the consumer to blend different source liquids together before placing the blend in an electronic cigarette, allowing the flavor to be customized.

In general, however, for both combustible smoking articles and other aerosol provision systems, any flavorant is present in each inhaled puff at a level depending on the proportion of flavorant to tobacco or source liquid, and will be delivered up until it has all been consumed by vaporization into the inhaled aerosol stream. This may be before the tobacco or source liquid has been consumed. The flavor is present and may then expire, and the consumer has no control over the level and duration of the flavor experienced.

Accordingly, approaches that offer some consumer control of flavor delivery are of interest.

SUMMARY

According to a first aspect of some embodiments described herein, there is provided a flavor delivery device for adding flavor to an aerosol stream generated by a smoking article, the device comprising: an electrical heating element configured for connection to an electrical power source; and a portion of flavorant provider arranged to receive heat from the heating element, the flavorant provider comprising flavorant material held in a substrate material, the flavorant material able to form a vapor and the substrate material softenable under the application of heat, wherein provision of electrical power to the heating element delivers heat to the flavorant provider to soften at least a part of the substrate material and release at least some of the flavorant material as a vapor.

The smoking article may be a combustible smoking article, such that the flavor delivery device is configured to be provided in a holder for the combustible smoking article, the holder comprising the electrical power source. Alternatively, the smoking article may be an electronic aerosol provision system comprising the electrical power source, and the flavor delivery device is configured to be provided in the electronic aerosol provision system.

The flavor delivery device may further comprise a support member in or on which the heating element is supported, the support member also supporting electrical contacts configured to connect the heating element to an electrical power source housed in an electronic aerosol provision system or smoking article holder. Alternatively, the heating element may be configured for provision of electrical power by induction.

The flavor delivery device may further comprise one or more further portions of flavorant provider. One or more portions of flavorant provider may be arranged on each of opposite surfaces of the support member. The flavor delivery device may further comprise one or more further heating elements configured to be individually provided with electrical power. The device may comprise a separate portion of flavorant material arranged to receive heat from each heating element.

The substrate material may comprise a wax material.

The provision of electrical power to the heating element to soften at least a part of the substrate material may comprise providing electrical power to deliver sufficient heat to melt the at least a part of the substrate material.

According to a second aspect of some embodiments described herein, there is provided an electronic aerosol provision system, a component of an electronic aerosol provision system or a smoking article holder comprising a socket for receiving a flavor delivery device according to the first aspect in a position that makes electrical connection with an electrical power source in the electronic aerosol provision system or smoking article holder and from which flavorant material released by the flavor delivery device is able to enter an airflow path for an aerosol stream through the electronic aerosol provision system or smoking article holder.

The socket may be configured to allow a user to remove and replace the flavor delivery device.

The electronic aerosol provision system, component of an electronic aerosol provision system or smoking article holder may comprise an external user-actuable switch operable to open and close connection of the electrical heating element to the electrical power source. Alternatively or additionally the electronic aerosol provision system, component of an electronic aerosol provision system or smoking article holder may comprise a computer processor configured to execute computer code stored in a memory to control the provision of electrical power to the heating element from the electrical power source, and optionally may further comprise a data transceiver configured to receive updated computer code for storage in the memory.

Also, a flavor delivery device according to the first aspect may further comprise a computer processor configured to execute computer code stored in a memory to control the provision of electrical power to the heating element, and a data transceiver configured to receive updated computer code for storage in the memory.

According to a third aspect of some embodiments described herein, there is provided a storage device storing computer code executable by a computer processor and operable to enable a computing device to: display a user interface that prompts a user to enter control parameters relevant to the addition of flavor from a flavor delivery device according to any of the claims to an aerosol stream generated by an electronic aerosol provision system or a smoking article; and transmit data representing the control parameters to a data transceiver in an electronic aerosol provision system, a component of an electronic aerosol provision system, a smoking article holder or a flavor delivery device.

According to a fourth aspect of some embodiments described herein, there is provided a method of adding flavor to an aerosol stream generated by a smoking article, the method comprising: arranging within an electronic aerosol provision system or a smoking article holder a flavor delivery device comprising an electrical heating element and a portion of flavorant provider arranged to receive heat from the heating element, the flavorant provider comprising flavorant material held in a substrate material, the flavorant material able to form a vapor and the substrate material softenable under the application of heat; providing electrical power to the heating element from an electrical power source in the electronic aerosol provision system or smoking article holder while a user is inhaling through the aerosol provision system or smoking article holder, whereby the provision of electrical power delivers heat to the flavorant provider to soften at least a part of the substrate material and release at least some of the flavorant material as a vapor; and delivering the released vapor into an aerosol stream flowing in an airflow passage through the electronic aerosol provision system or smoking article holder.

The method may further comprise transmitting control parameter data from a computing device to a data transceiver in the electronic aerosol provision system, smoking article holder or flavor delivery device, and controlling the provision of electrical power to the heating element using a computer processor in the electronic aerosol provision system, smoking article holder or flavor delivery device executing computer code in accordance with the control parameter data.

According to a fifth aspect of some embodiments described herein, there is provided a flavor delivery device for adding flavor to an inhalable airstream generated by an electronic cigarette, the device comprising: a support member; an electrical heating element on the support member; electrical contacts on the support member configured to make electrical connection between the electrical heating element and a battery in the electronic cigarette when the flavor delivery device is inserted into the electronic cigarette; and a portion of flavorant provider disposed on the support member over the electrical heating element, the flavorant provider comprising flavorant material held in a matrix material, the flavorant material able to form a vapor and the matrix material able to melt when heated; wherein the supply of electrical power to the electrical heating element provides heat to the flavorant material to melt the matrix material and release flavorant provider vapor therefrom.

These and further aspects of certain embodiments are set out in the appended independent and dependent claims. It will be appreciated that features of the dependent claims may be combined with each other and features of the independent claims in combinations other than those explicitly set out in the claims. Furthermore, the approach described herein is not restricted to specific embodiments such as set out below, but includes and contemplates any appropriate combinations of features presented herein. For example, a flavor delivery device may be provided in accordance with approaches described herein which includes any one or more of the various features described below as appropriate.

BRIEF DESCRIPTION OF THE DRAWINGS

Various embodiments will now be described in detail by way of example only with reference to the accompanying drawings in which.

DETAILED DESCRIPTION

Aspects and features of certain examples and embodiments are discussed/described herein. Some aspects and features of certain examples and embodiments may be implemented conventionally and these are not discussed/described in detail in the interests of brevity. It will thus be appreciated that aspects and features of apparatus and methods discussed herein which are not described in detail may be implemented in accordance with any conventional techniques for implementing such aspects and features.

Aspects of the present disclosure relate to smoking articles. In the context of the disclosure this term includes both combustible smoking articles (such as cigarettes, cigars, cigarillos and other articles based on the combustion of tobacco or other plant material) and electronic smoking articles such as electronic aerosol provision systems.

Some aspects of the present disclosure relate to (but are not limited to) electronic aerosol provision systems, such as e-cigarettes. Throughout the following description the term "e-cigarette" or "electronic cigarette" may sometimes be used; however, it will be appreciated this term may be used interchangeably with aerosol (vapor) provision system and electronic aerosol (vapor) provision system.

Figure 1:
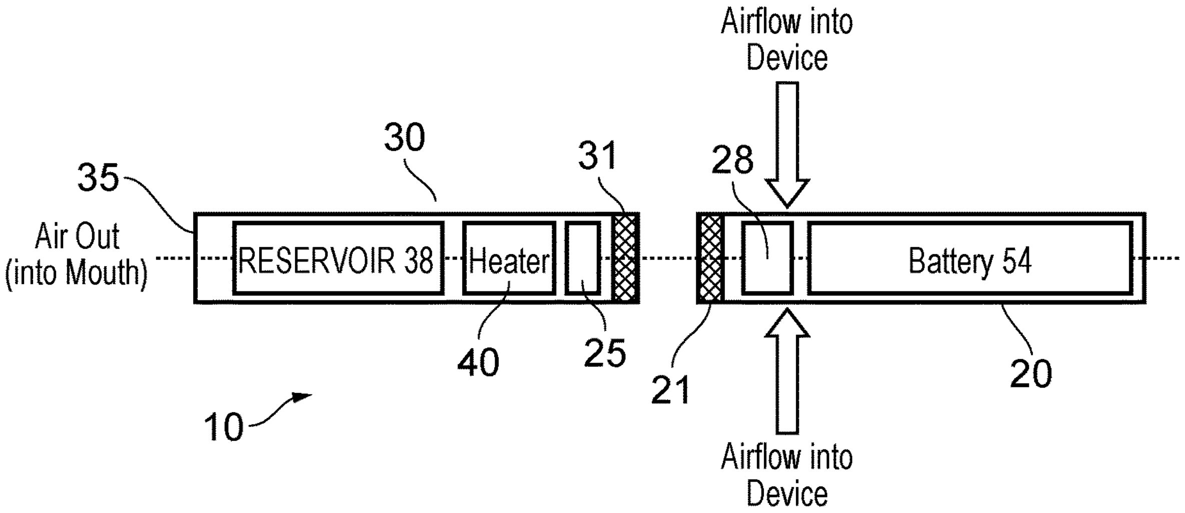
FIG. 1 shows a schematic representation of an example aerosol provision system in which embodiments of the disclosure may be implemented.

FIG. 1 is a highly schematic diagram (not to scale) of an aerosol/vapor provision system such as an e-cigarette 10 to which some embodiments are applicable. The e-cigarette 10 has a generally cylindrical shape, extending along a longitudinal axis indicated by dashed line, and comprises two main components, namely a body 20 and a cartridge assembly 30.

The cartridge assembly 30 includes a reservoir 38 containing a source liquid comprising a liquid formulation from which an aerosol is to be generated, for example containing nicotine, and a heating element or heater 40 for heating source liquid to generate the aerosol. The source liquid and the heater 40 may be collectively referred to as an aerosol source. The cartridge assembly 30 further includes a mouthpiece 35 having an opening through which a user may inhale the aerosol generated by the heater 40. The aerosol for inhalation may be described as an aerosol stream or inhalable airstream. As an example, the source liquid may comprise around 1 to 3% nicotine and 50% glycerol, with the remainder comprising roughly equal measures of water and propylene glycol, and possibly also comprising other components.

The body 20 includes a re-chargeable cell or battery 54 (referred to herein after as a battery) to provide power for the e-cigarette 10, and a printed circuit board (PCB) 28 and/or other electronics for generally controlling the e-cigarette 10. In use, when the heater 40 receives power from the battery 54, as controlled by the circuit board 28 possibly in response to pressure changes detected by an air pressure sensor (not shown), the heater 40 vaporizes source liquid at the heating location to generate the aerosol, and this aerosol stream is then inhaled by a user through the opening in the mouthpiece 35. The aerosol is carried from the aerosol source to the mouthpiece 35 along an air channel (not shown in FIG. 1) that connects the aerosol source to the mouthpiece 35 opening as a user inhales on the mouthpiece 35.

In this particular example, the body 20 and cartridge assembly 30 are detachable from one another by separation in a direction parallel to the longitudinal axis, as shown in FIG. 1, but are joined together when the device 10 is in use by cooperating engagement elements 21, 31 (for example, a screw or bayonet fitting) to provide mechanical and electrical connectivity between the body 20 and the cartridge assembly 30. An electrical connector interface on the body 20 used to connect to the cartridge assembly 30 may also serve as an interface for connecting the body 20 to a charging device (not shown) when the body 20 is detached from the cartridge assembly 30. The other end of the charging device can be plugged into an external power supply, for example a USB socket, to charge or to re-charge the battery 54 in the body 20 of the e-cigarette 10. In other implementations, a separate charging interface may be provided, for example so the battery 54 can be charged when still connected to the cartridge assembly 30.

The e-cigarette 10 is provided with one or more holes (not shown in FIG. 1) for air inlet. These holes, which are in an outer wall of the body 20 (but in other examples may be in an outer wall of the cartridge assembly 30), connect to an airflow path through the e-cigarette 10 to the mouthpiece 35. The air flow path may include a pressure sensing region (not shown in FIG. 1) in the body 20, and then connects from the body 20 into cartridge assembly 30 to a region around the heating element 40 so that when a user inhales through the mouthpiece 35, air is drawn into the airflow path through the one or more air inlet holes. This airflow (or the resulting change in pressure) is detected by a pressure sensor (not shown in FIG. 1) in communication with the airflow path that in turn activates the heater 40 (via operation of the circuit board 28) to vaporize a portion of the source liquid to generate the aerosol. The airflow passes through the airflow path, and combines with the vapor in the region around the heater 40 and the resulting aerosol (combination of airflow and condensed vapor) travels as an aerosol stream along the airflow path connecting from the region of the heater 40 to the mouthpiece 35 to be inhaled by a user.

In some examples, the detachable cartridge assembly 30 may be disposed of when the supply of source liquid is exhausted, and replaced with another cartridge assembly if so desired. In other examples it may be refillable with more source liquid. The body 20 may be intended to be reusable by recharging of the battery, for example to provide operation for a year or more by connection to a series of disposable detachable cartridges assemblies.

The aerosol provision system 10 further includes a flavor delivery device 25. In this example, the flavor delivery device 25 is located in the cartridge assembly 30. The device 25 operates to deliver flavorant to the aerosol stream in a controllable manner, as is described further below. Hence, it is positioned so as to be in airflow communication with the airflow path, so that flavor delivered by the device 25 is incorporated into the air flowing through the airflow path and hence into the aerosol stream for delivery to the user via the mouth. The flavor delivery device 25 may be positioned upstream or downstream of the heater 40 and the reservoir 38 with respect to the direction of airflow. Hence, the flavoring may be delivered into the airflow before the aerosol is generated, or into the aerosol stream once generated. In the former case, the flavor delivery device 25 might be positioned in the body (battery) section 20 instead of the cartridge assembly 30. The flavor delivery device 25 may be incorporated as a permanent component of either section, in particular the cartridge assembly 30 if this part is intended to be disposable. Alternatively, the flavor delivery device 25 may be a separate consumable component that the user inserts into one or other section of the e-cigarette 10 as required, and replaces when the flavor has been consumed or if a different flavor is desired. In such cases, it is convenient if the flavor delivery device 25 is received into the e-cigarette 10 in a location adjacent to the engagement elements 21, 31 for ease of access when the two parts 20, 30 of the e-cigarette 10 are separated. Other locations may also be used, for example if the cartridge assembly 30 or body 20 is configured to be separable at a further location distinct from the engagement elements 21, 31, or if an access slot or hatch is provided for insertion of the flavor delivery device 25 through an outer wall of the electronic cigarette 10.

Figure 2:
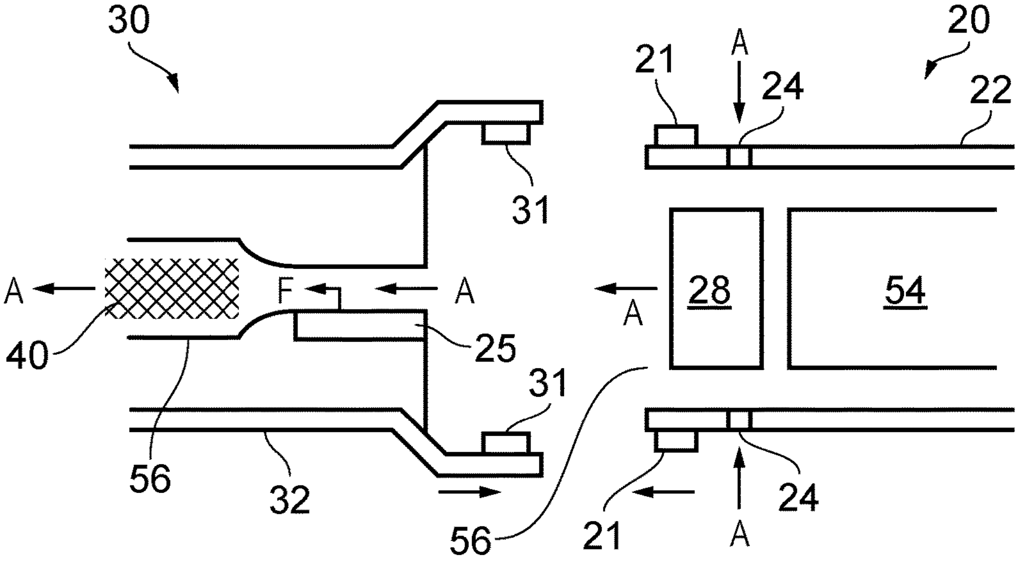
FIG. 2 shows a schematic longitudinal cross-sectional representation of part of an example aerosol provision system incorporating an example flavor delivery device.

FIG. 2 shows a schematic longitudinal cross-sectional view through a middle part of an example e-cigarette 10 similar to that of FIG. 1, where the cartridge assembly 30 and the body 20 connect, although they are illustrated in a separated configuration. In this example, the side walls 32, 22 of cartridge assembly 30 and the body 20 are shaped to allow a push fit (snap fit, bayonet or screw fittings may also be used). This brings the engaging elements 21, 31 into engagement, providing an electrical connection between the battery 54 in the body 20 and the heater 40 and the flavor delivery device 25 in the cartridge assembly 30. The side wall 22 of the body 20 has a pair of holes 24 (more or fewer holes may be employed) which allow the inlet of air, shown by the arrows A. The holes connect to a first part of a central air flow path or channel 56 located in the body 20, which is joined to a second part of the air flow channel 56 located in the cartridge assembly 30 when the cartridge assembly 30 and the body 20 are connected, to form a continuous air flow channel 56 to the mouthpiece 35 (the air flow therein being depicted by the arrows A). The heater 40 is located within the air flow channel 56 so that air can be drawn across it to collect vaporized source liquid when a user inhales through the mouthpiece 35 to pull air in through the holes 24. The heater 40 receives a supply of source liquid from the e-cigarette's reservoir (not shown in FIG. 2), for example by wicking (depending on the material and structure of the heating element). Air pressure changes caused by inhalation are detected and cause (under control of the circuit board 28) electrical power to be supplied from the battery 54 to the heater 40 to achieve the required heating and vaporization to generate the aerosol stream.

Electrical power for heating is also provided from the battery 54 to the flavor delivery device 25. In this example the device 25 is located in a side wall of the air flow channel 56 adjacent to the connecting end of the cartridge assembly 30 so that it can release flavor directly into the flowing air and also be readily inserted and removed by the user when the cartridge assembly 30 is separated from the body 20. Flavorant F is emitted in a vaporized form from the flavor delivery device 25 under application of electrical current from the battery 54, and delivered directly into the air flow channel 56 to be picked up by the air flow A. It is then carried along the air flow channel 56 to the heater 40 where the aerosol is generated, and is hence incorporated into the aerosol stream.

Note that in this example the flavor delivery device 25 is shown disposed directly in the airflow channel 56. This is not essential; the device 25 may alternatively be located in a chamber, slot or other aperture separate from the airflow channel but having an airflow communication therewith for transfer of flavorant to the aerosol stream.

Figure 3:
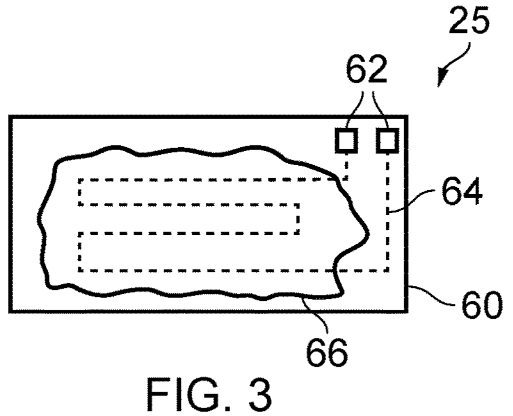
FIG. 3 shows a plan view of a first example flavor delivery device.

FIG. 3 shows a plan view of a first example of a flavor delivery device 25. The device 25 comprises a support member 60, which conveniently may be planar but might have an alternative configuration for example to fit more efficiently within a particular configuration of e-cigarette. For example, it might be tubular or ring-shaped so as to surround the air flow channel 56. The support member 60, which should be electrically insulating, may be formed from fiber glass board, for example, although other materials may be used. Two or more electrical connectors 62 are formed on the surface of the support member 60 such that when the device 25 is inserted into an e-cigarette, the electrical connectors make electrical contact with other connectors in electrical connection with a battery in the e-cigarette (such as the battery 54 in FIGS. 1 and 2). The electrical connectors 62 are connectors to supply electricity to a heating element 64 disposed on or in the support member 60. FIG. 3 shows a heating element 64 which has a serpentine shape winding across the area of the support member 60; other elements may have a zig-zag, curved, spiral, straight or other shape, and/or two or more separate heating elements may be provided, in any shape or pattern.

A flavorant provider or flavorant providing material 66 is disposed as a layer over the surface of the support member 60, so as to cover at least part of the area served by the heating element 64. The flavorant provider 66 comprises a matrix or substrate material which holds a flavorant material within it. The flavorant material may be any flavoring substance which can take the form of a vapor, either as a gas or as liquid droplets, so as to be carried by the airflow and incorporated into the aerosol stream. Hence the flavorant may be a volatile substance. The vapor state may be present at typical room temperatures, or may be formed from a liquid or solid flavorant material under the action of heat. The matrix or substrate material may be any suitable material that has a solid or near-solid (a gum or paste for example) state at room temperature, and which can hold the flavorant material incorporated into it. For example, the flavorant material may be formed into a mixture with the matrix material (for example a liquid flavorant mixed into the matrix material), or it may be encapsulated (in microcapsules by any known technique, for example) and the capsules mixed into the matrix material, or the matrix material may be formed with an interstitial structure and the flavorant material injected or deposited into the interstices (for example by immersion of the matrix material into a bath of liquid flavorant). Additionally, the matrix material has the property of changing state when heated, so that heat applied by the heating element causes it to wholly or partially transition from one state to or towards another, in particular from a solid or gel state towards or into a liquid state. The heated and thereby softened matrix material can release the vapor state of the flavorant material from it. In some cases, the matrix material need only change towards a liquid state (become less solid), and in some cases it will become liquid, i.e. it will melt. In the context of the present disclosure, the matrix material is considered to soften under the application of heat to release the flavorant material, where softening includes becoming less solid as well as melting to a liquid or near-liquid state. The amount (degree) of softening required depends in part of the volatility of the flavorant and the manner in which it is held in the matrix material. A more volatile flavorant may be able to escape from a slightly softened matrix, such as through interstices in the matrix or by rupturing the surrounding matrix material if the vapor pressure is high enough. A lower volatility may require melting of the matrix for the flavorant to be released. Some flavorants may require a full collapse, disintegration or other degrading of the structure of the matrix material to escape; this might be achieved by melting. The term "softening" is intended to cover all these various changes, and indicates that a full or partial heat-induced state change towards a less solid form is provided by the heating element to release the flavorant from the matrix. The flavorant may be able to vaporize directly from the matrix material, possibly also under the action of the applied heat which may drive the vapor out of the matrix material. Alternatively, softening of the matrix material and/or encapsulated material may allow the flavorant to be released, either still as a liquid to be subsequently vaporized, or directly into a vapor state.

Suitable materials for the matrix or substrate include waxes (which are typically lipophilic and non-porous; examples include natural and synthetic waxes, such as animal waxes for example beeswax, mineral waxes for example montan wax, petroleum waxes for example paraffin waxes, polyolefin waxes for example polyethylene waxes and polypropylene waxes, and vegetable waxes for example candelilla wax, carnauba wax, castor wax and soy wax), gelatin, alginates and gums (such as xanthan gum), and starches. The purpose of the matrix material is to hold the flavorant material in such a way that loss of the flavorant material from the matrix material at typical room temperatures (15° C. to 30° C., for example) is minimal (zero or very low), but to release the flavorant material as a vapor once heat is applied to soften the matrix material. Temperatures in the range of 25° C. to 70° C. or 80° C., or 25 C° to 60 C°, or 30 C° to 70 C°, or 30 C° to 80 C°, or 40 C° to 70 C°, or 40 C° to 80 C° C. may be suitable to produce the required release of the flavorant material, but the exact temperature will be selected with reference to the type of matrix material and the type of flavorant material. For example, a higher temperature might be used, such as between 80° C. and 100° C. The heating element and the supply of electrical current thereto from the battery can be configured to apply an appropriate level of heating to reach the desired temperature for the flavorant provider. The heating should be achieved within a time scale for the flavorant to be delivered into the aerosol stream as the user inhales, so should preferably be fairly rapid. For example, the required heating of the flavorant provider may be delivered concurrent with the start time of the inhalation, or starting within half a second or less of the inhalation start time. Other configurations, such as under user control, may enable the heater to be activated in advance of the inhalation start time to give an immediate boost of flavor as soon as the user inhales. Electrical current for heating is provided for a fixed duration (which may be variable between inhalations, but may be such as for about 1 second at the start of an inhalation, which will typically have a 3 second duration), and after the heating has been applied, the matrix material will cool and harden/resolidify back to its usual room temperature state to retain the remaining flavorant material. A matrix material able to cool relatively quickly may be preferred to avoid loss of flavorant material between puffs. Heating for less than the expected inhalation time (for example, 3 seconds) may be preferred for conserving the flavorant material, since flavorant released in later parts of the inhalation will be less effectively delivered to the user, so is in effect wasted.

The thickness of the layer of flavorant provider 66 can be selected with regard to factors including the total volume of flavorant material it is desired to provide in a single device, and how quickly the heat can be delivered from the heating element 64 to the outer surface of the flavorant provider 66 (determined by factors including the thermal properties of the flavorant provider).

The flavorant provider layer can be applied to the support member 60 in any convenient manner having regard to the form of the material and the required thickness. A thicker material such as a paste, gum or wax might be applied by a spreading technique, for example by injecting or depositing a portion of flavorant provider 66 onto the surface of the support member 60 and moving the support member 60 past a spreading blade or between rollers. The material may be heated slightly to soften it and aid spreading, but the temperature should be kept below that at which the flavorant material is released. In other examples, the flavorant provider 66 may be formulated as a liquid (for example containing encapsulated flavorant suspended in a liquid matrix material) which can be sprayed, painted or printed onto the support member, and allowed to dry to form the required layer. Multiple layers might be applied to achieve the desired thickness. Alternatively with a liquid or semi-liquid formulation, the support member may be dipped into a reservoir of flavorant provider 66, either surface first to apply a portion to one surface of the support member only, or edge first if portions are required on both surfaces of the support member. In yet further examples, portions of flavorant material might be molded into solid or semi-solid rigid or flexible tablets or lozenges which can be adhered to the surface of the support member.

The flavorant material is intended to add a taste and/or an aroma to the aerosol air stream (in addition to any flavor contributed from the source liquid, although the flavor delivery device allows the use of unflavored source liquid if desired). As used herein, the terms "flavor" and "flavorant" refer to materials which, where local regulations permit, may be used to create a desired taste or aroma in a product for adult consumers. They may include extracts (e.g., licorice, hydrangea, Japanese white bark, magnolia leaf, chamomile, fenugreek, clove, menthol, Japanese mint, aniseed, cinnamon, herb, wintergreen, cherry, berry, peach, apple, Drambuie, bourbon, scotch, whiskey, spearmint, peppermint, lavender, cardamom, celery, cascarilla, nutmeg, sandalwood, bergamot, geranium, honey essence, rose oil, vanilla, lemon oil, orange oil, cassia, caraway, cognac, jasmine, ylang-ylang, sage, fennel, piment, ginger, anise, coriander, coffee, or a mint oil from any species of the genus Mentha), flavor enhancers, bitterness receptor site blockers, sensorial receptor site activators or stimulators, sugars and/or sugar substitutes (e.g., sucralose, acesulfame potassium, aspartame, saccharine, cyclamates, lactose, sucrose, glucose, fructose, sorbitol, or mannitol), and other additives such as charcoal, chlorophyll, minerals, botanicals, or breath freshening agents. They may be imitation, synthetic or natural ingredients or blends thereof. They may be in any suitable form, for example, oil, liquid, or powder, that allows delivery of flavorant vapor.

Figure 4:
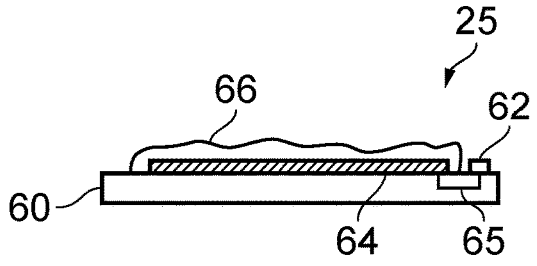
FIGS. 4, 5 and 6 show cross-sectional side views of second, third and fourth example flavor delivery devices.

FIG. 4 shows a cross-sectional view of an example flavor delivery device. In this example, the heating element 64 is formed on the outer surface of the support member 60. This may be by depositing a resistive track using any conventional technique for fabricating printed circuit boards, for example. Other techniques may be used as preferred. The heating element 64 is connected at its ends to the connectors 62 by conducting elements 65, which are shown passing within the support member 60 for clarity, but can conveniently be formed on the surface together with the heating element 64 and the connectors 62, possibly in a single fabrication step. The portion of flavorant provider 66 is then applied as a layer over the top of the heating element 64.

Figure 5:
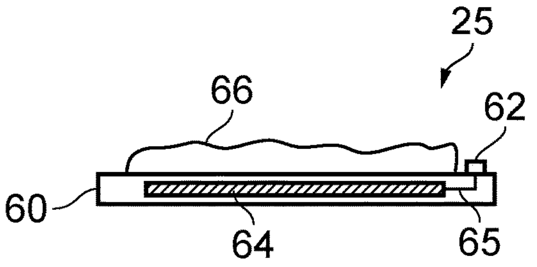

FIG. 5 shows a cross-sectional view of a further example flavor delivery device. In this example, the heating element 64 is disposed within the thickness of the support member 60, rather than on its surface. Such a structure may be fabricated by sandwiching a resistive wire between two layers of fiber glass or other board, for example. The heating element 64 is connected to the connectors 62 on the surface of the support member 60 by conducting elements 65. The portion of flavorant provider 66 can then be applied to either surface of the support member 60, depending on the structure of the e-cigarette in which the flavor delivery device is intended to be used and the relative positions of electrical connections and the air flow channel. FIG. 5 shows the portion 66 applied to the same surface as the electrical connectors 62, but it may instead by applied to the opposite surface. For example, it may be convenient to configure electrical connectors in the e-cigarette to mate with the side of the flavor delivery device remote from the part of the airpath to which the flavorant provider is exposed.

Figure 6:
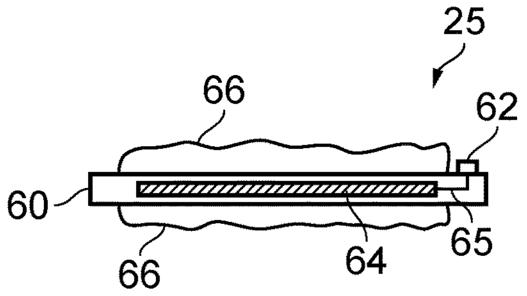

FIG. 6 shows a cross-sectional view of another example flavor delivery device 25. This example has the same structure as that in FIG. 5, with a heating element 64 disposed within the support element 60. It differs from the FIG. 5 example by having a portion of flavorant provider 66 applied to both sides of the support member 60. This configuration can be used in e-cigarettes configured such that air or aerosol flowing in the air flow channel can pass over both sides of the flavor delivery device 25, to collect released flavorant vapor from both portions of flavorant provider. This can double the amount of flavorant material carried by a single device, for example, or allow the portion of flavorant provider to be divided into two thinner layers so that the heating effect can reach the portion surface more quickly. Alternatively, a portion of flavorant provider may be applied to both sides of the support member in a device having a surface-supported heating element if the support member is sufficiently thin and/or a sufficiently good conductor of heat for the heating element to deliver adequate heat energy through the thickness of the support member to the flavorant provider on the opposite surface.

In any embodiment, the electrical connectors 62 can be positioned on either side of the support element 60 as convenient, or the pair of connectors 62 can be arranged so that one connector 62 is on a first side of the support member 60 and the other connector 62 on the second side of the support member 60. Alternatively, one or both connectors 62 might be located on one or more edges of the support member 60. Any position can be used, to make connections with mating connectors in preferred locations within the e-cigarette.

The FIGS. 3 to 6 example devices have a single heating element. In alternative examples, two or more separate heating elements might be provided. The heating elements might serve the same flavorant provider portion and be addressable individually or together according to choice, to increase control over the level of heating and hence level of flavorant release provided at any given time. Alternatively, separate portions of flavorant provider may be arranged to be heated by the separate heating elements. The heating elements might then be configured to be addressed sequentially, so that a second portion can deliver flavorant once a first portion has been consumed. As an alternative, the heating elements may be addressed individually according to consumer choice so as to release flavor from a selected portion on demand. In this way, more than one flavorant can be delivered from a single flavorant delivery device 25.

The heating elements may be disposed to serve opposite sides of the support member, or to serve different regions of the same side of the support member. The various portions of flavorant provider can be applied to the support member accordingly, in correspondence with the heating elements. The heating elements may be on the surface of the support member, as in FIG. 4, or within the thickness of the support member, as in FIGS. 5 and 6.

Figure 7:
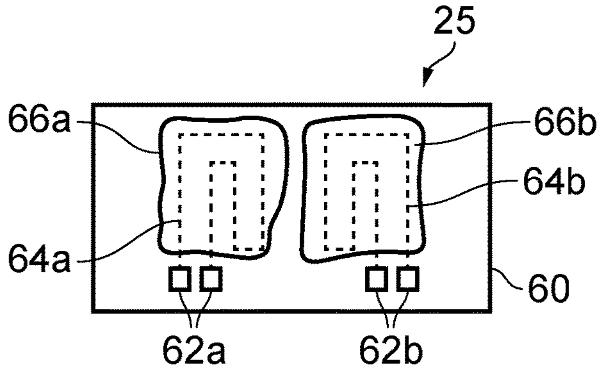
FIG. 7 shows a plan view of a further example flavor delivery device.

FIG. 7 shows a plan view of a first example device with two heating elements. In this example, the two heating elements 64*a*, 64*b* with corresponding electrical connectors 62*a*, 62*b* are disposed side-by-side on the same surface of the support member 60. Each has a corresponding flavorant rant provider portion 66*a*, 66*b*. The portions may comprise different flavorants or the same flavorant.

Figure 8:
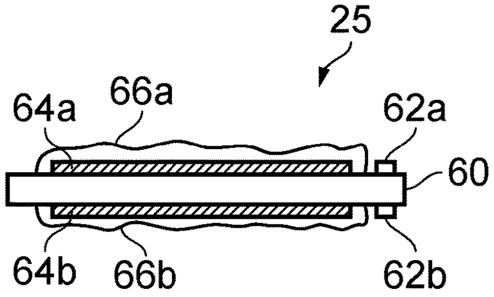
FIG. 8 shows a cross-sectional side view of a still further example flavor delivery device.

FIG. 8 shows a cross-sectional view of a second example device with two heating elements. In this example, the two heating elements 64*a*, 64*b* with corresponding electrical connectors 62*a*, 62*b* are disposed one on each opposite surface of the support member 60. Each has a corresponding flavorant provider portion 66*a*, 66*b*, which may comprise the same or different flavorants.

These designs can be extended to provide any number of separate heating elements, arranged on one or both sides of the support member. Each heating element may serve a separate portion of flavorant provider, or a single portion of flavorant provider may cover two or more heating elements.

In further alternative designs, a flavor delivery device may comprise a heating element and a portion of flavor delivery material in contact therewith, without any support member. If the heating element is structured so as to be largely self-supporting, for example formed from rigid or resilient wire or stamped or cut from an appropriate thickness of metal, there may be no requirement for a support member. The heating element may have a surface coating of flavor provider (formed for example by dipping the heating element into a liquid formulation of flavor provider), or may be wrapped or coiled around, or inserted into, a solid or semi-solid portion of flavor provider. The ends of the heating element can be shaped as the electrical connectors for insertion into socket connectors in the electronic cigarette to create the required electrical connection to the battery.

The electronic cigarette has a socket, recess, aperture, cavity, receptor or similar to receive, hold and accommodate the flavorant delivery device, and make the required electrical connections to the electrical connectors of the heating element to provide electrical power to the heating element from the battery of the electronic cigarette. The socket may be configured so that the flavorant delivery device can be removed by a user and replaced with a different device, or the flavorant delivery device may be included as a non-replacement component in a disposable cartridge assembly, in which case access to the flavor delivery device is not required and it can be sealed inside the assembly in an inaccessible position. Any configuration can be utilized to accommodate the flavorant delivery device.

Figure 9:
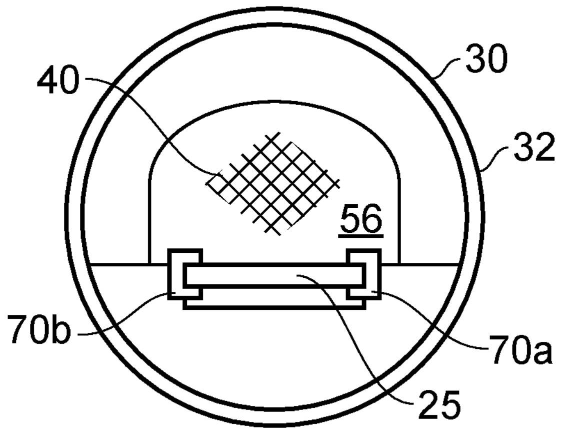
FIG. 9 shows an end view of an example cartridge assembly component of an aerosol provision system housing an example flavor delivery device.

FIG. 9 shows a simplified view of a first example configuration for a flavor delivery device 25 within a cartridge assembly 30, shown as an end view of the cartridge assembly disconnected from its body (battery) section, looking into the interior of the cartridge assembly 30. Not all components are shown. The cartridge assembly 30 has a circular cross-section bounded by an outer wall 32, and has an air-flow channel 56 formed substantially centrally within it. The heating element 40 of the aerosol source is visible inside the channel. The flavor delivery device 25 slots into a socket at one side of the air flow channel. A pair of oppositely facing u-shaped tracks 70*a*, 70*b* are provided which receive and grip opposite edges of the flavor delivery device 25. The device 25 can be slid into these tracks 70*a*, 70*b* which guide it into the received position in which the electrical connections are made. The tracks 70*a*, 70*b* can be conductive (for example made from a metallic conductive material) so as to form the electrical connectors of the electronic cigarette to connect with those on the flavor delivery device 25, or have electrical connectors mounted thereon, or can be shaped to guide the flavorant delivery device 25 into a position that makes contact with electrical connectors mounted on another part of the electronic cigarette 10. As depicted, the tracks 70*a*, 70*b* hold the flavor delivery device 25 spaced apart from the adjacent wall of the air flow channel 56 so that air can flow over both surfaces of the device. The device 25 may therefore have a portion of flavorant provider on each surface, if desired. Alternatively, the tracks 70*a*, 70*b* may hold the device 25 substantially flush with the air flow channel wall so that air can flow over one surface only.

Figure 10:
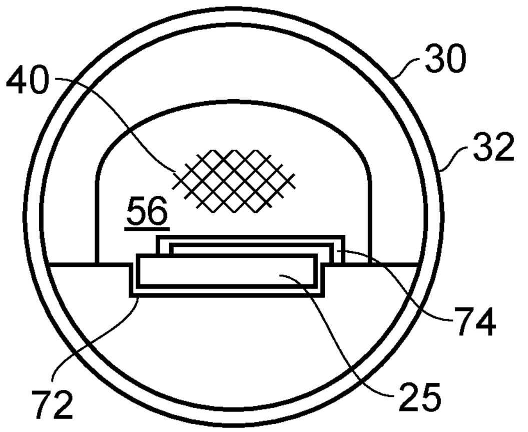
FIG. 10 shows an end view of a further example cartridge assembly component of an aerosol provision system housing an example flavor delivery device.

FIG. 10 shows a simplified view of a second example configuration for a flavor delivery device 25 within a cartridge assembly 30, again shown in end view. This configuration holds the flavor delivery device 25 in a similar location to the FIG. 9 example. There is a shallow recess 72 in the side wall of the air flow channel into which the flavor delivery device 25 can be pushed. A resilient, biased or spring-loaded arm 74 attached at one end to part of the cartridge assembly extends over the recess 72 to press against the installed device 25 and hold it in position, in a similar manner to how a subscriber identity module (SIM) is held inside a mobile telephone. The arm 74, formed for example from bent metal, can itself form the electrical connectors if appropriately shaped, or may have the connectors otherwise provided on it, or may simply hold the device 25 in a correct position for contact with electrical connectors in the cartridge assembly.

In both the FIG. 9 and FIG. 10 examples the flavor delivery device 25 is easily accessible from the open end of the disconnected cartridge assembly so can be removed by the user and replaced if required. The examples are not limiting, and any alternative configuration for receiving, holding and connecting the flavor delivery device 25 may be used as desired. Many alternatives will be readily apparent to the skilled person.

In order to provide the user with control over flavor delivery, the heating element of the flavor delivery device 25 can be provided with electrical power independently from the supply of electrical power to the aerosol source heater. If the heating element and the heater receive electrical power simultaneously from the battery in response to air pressure changes caused by inhalation, flavor is delivered in a fixed manner with every puff until the flavorant material has all be released. By de-coupling the electrical supply of the heating element from that of the heater and making it independent, flavor can be delivered as desired by the user, for example a greater or smaller amount in each puff or in only some puffs.

This control can be implemented in a variety of ways. A simple example is a switch on the exterior of the electronic cigarette which the user can operate during any inhalation to which he desires to add flavor. Electrical power can be delivered to the heating element whenever the switch is activated, and turned off when the switch is deactivated. Alternatively, the switch can operate to turn on the heating element as the user desires, but if it has not already been turned off the electrical power supply is automatically terminated at the end of the inhalation (detected by the pressure sensor used to control power supply to the aerosol source) so that it is not possible for the flavor delivery device 25 to be left on for an extended period. This improves safety to avoid overheating, and reserves the release of flavor for the times it is actually needed, so the flavorant is not wasted. As an extension of this arrangement, the switch can be configured to that it cannot be operated to turn the heating element on unless an inhalation has been detected by the pressure sensor. In this way, the heating element can only be operated while a user is inhaling through the electronic cigarette.

The switch can take any convenient format, such as a touch-sensitive switch, a push button, a toggle switch or a sliding switch. It can be positioned on any outer part of the electronic cigarette, but is preferably in a location where the user can easily operate it when holding the electronic cigarette during inhalation but where a deliberate action is needed to operate it to avoid accidental operation. If the switch is provided on the body section which accommodates the battery, it is not included in the potentially disposable cartridge assembly section and can have an extended lifetime. It may be located on the cartridge assembly if preferred, however.

Figure 11:
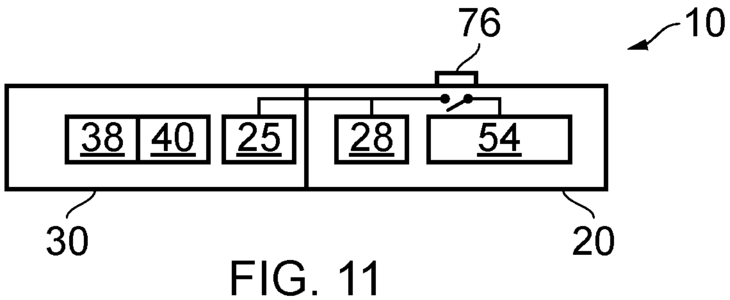
FIG. 11 shows a schematic representation of a first example aerosol provision system including a flavor delivery device.

FIG. 11 shows a highly schematic simplified diagram of an electronic cigarette 10 configured with a switch to operate a flavor delivery device 25. As with the example of FIG. 1, the electronic cigarette 10 comprises a cartridge assembly 30 connectable to a body section 20, and housing an aerosol source comprising a reservoir 38 and a heater 40, and a flavor delivery device 25. The body 20 houses a battery and a PCB 28 with a pressure sensor. Joining the cartridge assembly 30 to the body 20 forms an electrical connection between the two parts so that electrical power can be provided from the battery to the heater 40 and the flavor delivery device 25. The PCB 28 controls the supply of electrical power to the heater (via circuitry not shown) in response to pressure changes detected by the pressure sensor. The body 20 further comprises a user-operable external switch or button 76 on its outer surface that actuates a switch 78 in circuitry within the body 20. When the switch 78 is closed, electrical power is delivered from the battery 54 to a heating element of the flavor delivery device 25. The PCB 28 may be joined to this circuitry too and appropriately configured to provide a degree of further control so that the switch 78 can only be closed during times when the pressure sensor detects an inhalation, as described above. Otherwise, the PCB 28 maintains the switch 78 in the open position so that the heating element of the flavor delivery device 25 is inoperable.

A switch-operated flavor delivery device 25 provides the user with the option to add flavor or not add flavor to any puff, and by keeping the switch 78 closed for a longer or shorter time control over the amount of flavor per puff can be achieved. A more sophisticated level of control can be achieved by providing programmable control over the heating element operation, however.

Figure 12:
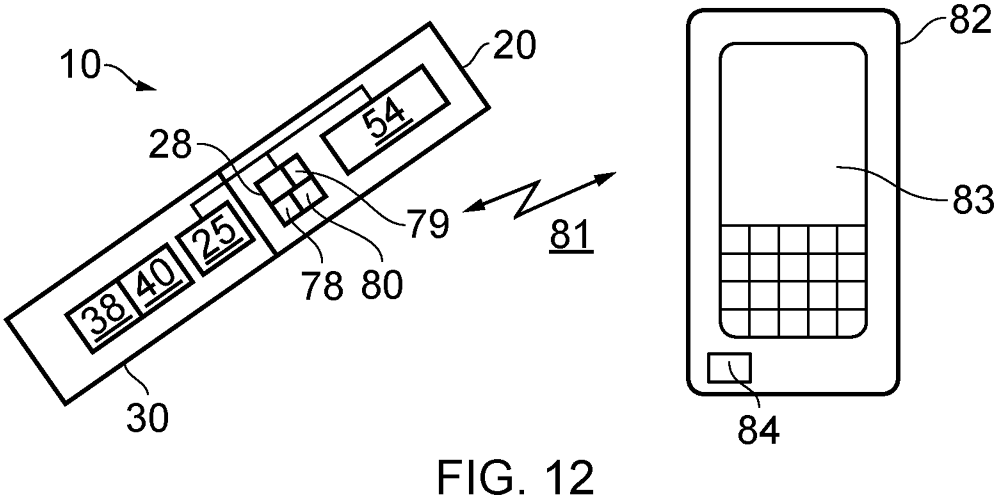
FIG. 12 shows a schematic representation of a second example aerosol provision system including a flavor delivery device.

FIG. 12 shows a highly simplified (not to scale) representation of an example electronic cigarette 10 configured for programmable control. The electronic cigarette 10 comprises the same components as the FIG. 11 example, with a battery 54 in the body section 20 providing electrical power to a flavor delivery device 25 in the cartridge assembly 30, via circuitry. A PCB 28 providing general operational control for components in the electronic cigarette 10 has control over the supply of electrical power from the battery 54 to the flavor delivery device 25. The PCB 28 includes a microprocessor 78 and memory 79 bearing computer code executable by the microprocessor 78 to control how and when the battery provides electrical power to operate one or more heating elements of the flavor delivery device 25. The control may be according to control parameters such as which heating element to operate (in the event there is more than one); which puffs to operate the heating element for (every puff, alternate puffs, the first one, two or three puffs after switch-on of the electronic cigarette, for example); how much power to deliver (to control how hot the heating element will get and hence how much flavor will be released); and how long to deliver power for in any given puff.

To allow a user to customize these parameters, the stored computer code can be modified or re-programmed. The PCB 28 comprises a data transceiver element 80 configured to communicate wirelessly with a transceiver element 84 in a computing device 82. The transceiver elements are configured to establish a wireless communication path 81; this may be by any convenient wireless method such as by Bluetooth or radio frequency communication or infrared signals. The computing device 82 may be any device able to receive user input and transmit this information over the wireless communication path 81, such as but not limited to a mobile telephone, a smart phone, a tablet device, a smart watch, a laptop computer or desktop computer. The computing device 82 is provided with appropriate software (downloadable from the internet or otherwise installed by the user according to the model of electronic cigarette the user has, for example) to allow programming of the flavor delivery device 25. A display 83 on the computing device 82 presents a user interface that prompts the user to enter appropriate information to configure the control parameters. For example, a list of available flavors may be presented for selection, and the user may chose which puffs to add flavor to, and enter the level of flavor desired in each chosen puff. This might be via a slider control, for example, which allows selection of a flavor level between a maximum and a minimum, with the computing device 82 and/or the microprocessor 78 of the PCB 28 converting the chosen level into an amount of electrical power required to deliver that flavor level. Once the parameters have all been set to the user's satisfaction, data representing the parameters is transferred from the computing device 82 to the electronic cigarette 10 via the communication path 81, for example in response to user activation of a "done" or "save" control on the user interface. The data is stored in the memory 79 for execution by the microprocessor 78 during future use of the electronic cigarette 10.

For control purposes, the data transceiver element may be configured for data reception only. However, if it is also configured for transmission, the electronic cigarette can communicate back to the user device, for example to notify when the flavor delivery device 25 is about to expire (all the flavorant has been released, estimated from the amount of heating provided to release the flavor since the device 25 was installed, for example). Also, the electronic cigarette can automatically notify the computing device of the type or model of flavor delivery installed so that the computing device can prompt the user to program the appropriate control parameters. To achieve this, the flavor delivery device 25 may be provided with an identity code embedded in circuitry or software that is readable by the microprocessor 78 via the circuitry. In the absence of this, the user can enter the device type into the computing device, by selecting it from a list presented by the user interface, for example. The computing device can then present an appropriate user interface for programming of the parameters relevant to the particular flavor delivery device 25.

Figure 13:
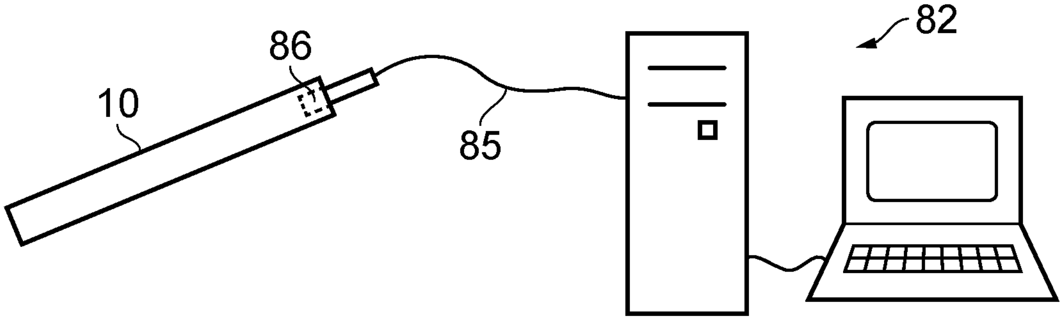
FIG. 13 shows a schematic representation of a third example aerosol provision system including a flavor delivery device.

Alternatively, an electronic cigarette may be configured for programming via a wired connection to a computing device. FIG. 13 shows a highly simplified (not to scale) representation of such an arrangement. The electronic cigarette 10 has a data socket 86 into which a data transfer cable 85 can be plugged to allow the electronic cigarette 10 to be connected to a computing device 82, which in this example is a desktop computer system. The data transfer may be via USB or Ethernet, for example, although any data transfer protocol might be employed. Conveniently, the data socket 86 can be embodied also as a charging socket for recharging the battery of the electronic cigarette; a USB port will be convenient for this, for example. Otherwise, the system can operate in the same or similar manner to that described with respect to FIG. 12. The computing device has software to present a user interface for input of desired control parameters by the user, and these are transferred to memory on the electronic cigarette 10 via the data cable 85.

Note that the functions of the PCB (or other electronics) and its components may be achieved using any combination of software, hardware and firmware as required.

Thus far, examples of the disclosure have been described in the context of electronic cigarettes or other aerosol and vapor provision systems. It is not so limited, however. Embodiments can be used to add flavor to conventional combustible smoking articles such as those based on tobacco consumption.

To implement this, it is proposed to provide a holder for a combustible smoking article through which the user inhales to consume the combustible smoking article, in the manner of a conventional cigarette holder, for example, where the holder can also house and power a flavor delivery device such as any of the examples described above.

Figure 14:
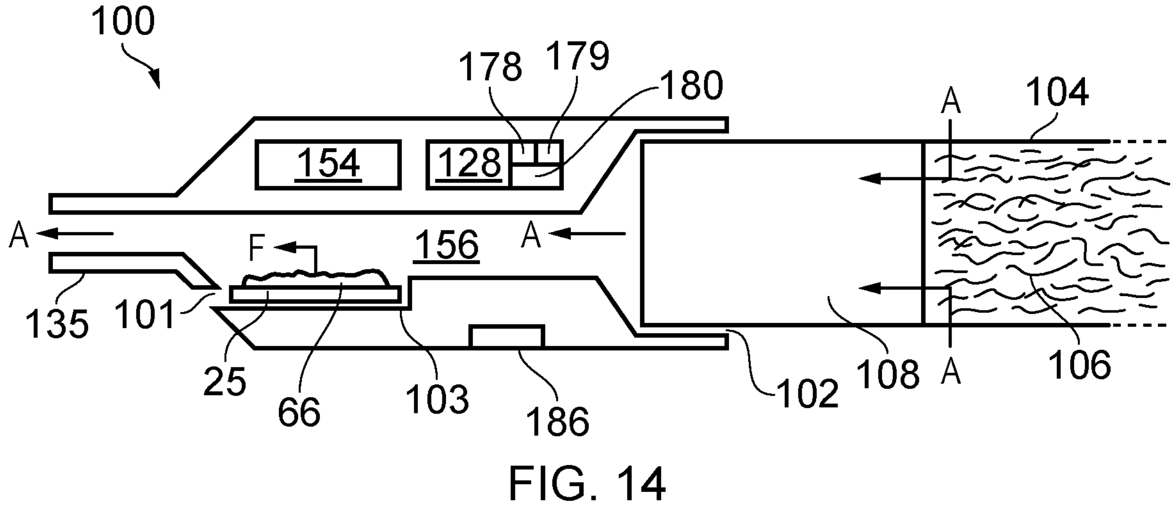
FIG. 14 shows a longitudinal cross-sectional view of a first example smoking article holder incorporating a flavor delivery device.

FIG. 14 shows a simplified schematic cross-sectional view of an example combustible smoking article holder 100. The holder 100, which may be made from molded plastics or other materials, is substantially a tubular structure with a central bore forming an air flow path 156 extending between an opening 102 at a combustible smoking article end into which a combustible smoking article 104 can be inserted for consumption, and a mouthpiece 135. When a combustible smoking article 104 is inserted into the holder 100 and lit, the user inhales through the mouthpiece 35. This draws air into the tobacco rod 106 of the combustible smoking article where it collects smoke, nicotine and other components released from the burning tobacco in the usual manner. This is drawn through the filter 108 of the combustible smoking article (or simply out of the combustible smoking article's end if it is filterless) and into the airflow path 156 inside the holder 100, whence the user inhales it through the mouthpiece. This airstream A corresponds to the aerosol stream in an electronic cigarette, and for the purposes of this disclosure the terms are interchangeable.

The holder 100 is configured such that a flavor delivery device 25 can be inserted into it so that flavor F released by a flavorant material portion 66 on the device 25 is picked up by the airstream through the holder, thereby adding flavor to the output of the combustible smoking article. The holder 100 has a slot 101 in a side wall into which a flavor delivery device can be inserted. The slot 101 gives access to a socket 103 in the form of a recess in the side of the airflow path 156 which receives and holds the flavor delivery device 25 in a position in which flavor released from it is communicated into the airflow path 156. The holder may alternatively be configured and designed to receive and hold the flavor delivery device in any other convenient manner. The holder 100 is provided with a battery 154 and a PCB 128 or other control electronics (including a pressure detector in some embodiments for detecting when a user is inhaling though the holder 100) similar to those described above with regard to the electronic cigarette examples. Electrical contacts and circuitry connect the installed flavor delivery device 25 to the battery 154 for provision of electrical power to heating elements of the flavor delivery device 25. The PCB and its microprocessor 178 control the heating in accordance with control parameters stored in computer code in the memory 179. The parameters may be programmed or updated according to user preference via data updates received from a computing device by a transceiver element 180, as before. A socket 186 is provided for recharging the battery; this may also provide control parameter or other data to the memory 179 via a wired connection to a computing device, again as before.

With a holder such as this example, it is possible to add any flavor to a conventional combustible smoking article entirely at the desire and demand of a user. This provides considerably more sophisticated flavor addition than the simple addition of flavorants into the tobacco material or filter material to include flavor in every puff at a predetermined level that cannot be modified by the user.

Alternatively, a holder can be configured for switch-operated flavor control, similar to the switch-operated functionality of the FIG. 11 electronic cigarette.

Figure 15:
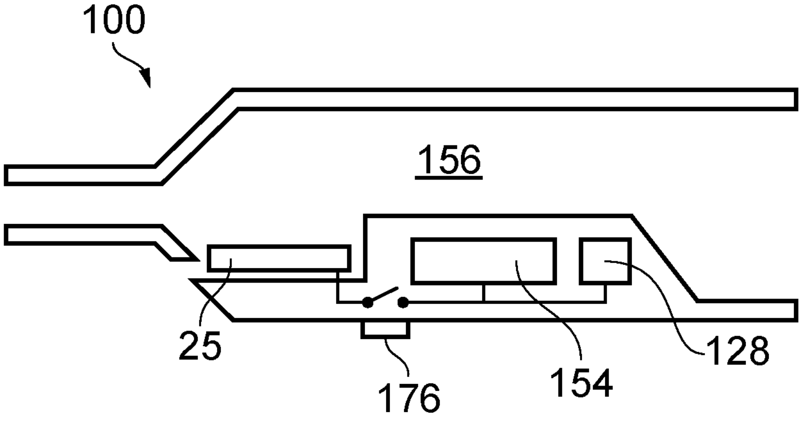
FIG. 15 shows a longitudinal cross-sectional view of a second example smoking article holder incorporating a flavor deliver device.

FIG. 15 shows a simplified schematic cross-sectional representation of an example holder configured with a switch. The holder 100 has a switch 176 (of any desired format, as before) located on its outer wall that operates to connect the battery 154 to the heating element of the flavor delivery device 25, thus providing heating and flavorant release. Control electronics 128 possibly including a pressure sensor may be included to limit operation of the heating element to times when a user is inhaling through the holder 100, for safety reasons and to conserve the flavorant, again as described with respect to electronic cigarette examples. A holder of this type allows a user to add flavor to any puff of a combustible smoking article simply by operating the switch, and the flavor delivery device can be changed at any time to alter the flavor if desired.

Furthermore, smoking article holders configured to include a flavor delivery device may alternatively be used to hold and add flavor to an electronic aerosol provision system (such as an electronic cigarette) instead of a combustible smoking article. Hence, references to "smoking article holder" include holders configured to hold either combustible smoking articles, electronic aerosol provision systems, or both.

Note that it is also possible to provide the functions of the PCB or other electronics in controlling the operation of the heating element directly on the flavor delivery device rather than in the electronic cigarette or smoking article holder. The processor, memory and data transceiver may be mounted on the support member and provided with appropriate circuitry and electrical power supply. While this adds to the cost and complexity and possibly the size of the flavor delivery device, it allows the device to be used with an electronic cigarette having a PCB that is not configured for flavor delivery control. For example, the user may replace a disposable cartridge assembly component with one configured to receive a flavor delivery device while keeping an existing reusable body component of their electronic cigarette.

The examples described so far have all utilized conventional resistive electrical heating to release flavorant from the flavor delivery device. The device has one or more heating elements which are connectable by wires, leads or the like to an electrical power source (battery) to produce current flow through the heating element so that the temperature of the heating element is increased. The amount of heat generated depends on the electrical resistance of the heating element and the amount of current flowing through it or voltage (potential difference) applied across it.

As an alternative, a flavor delivery device might use induction (inductive) heating to generate heat in the heating element(s). Induction heating is a phenomenon that allows heating of an electrically conductive item, typically made from metal, by electromagnetic induction. An electronic oscillator is provided to generate a high frequency alternating current that is passed through an electromagnet. In turn, the electromagnet produces a rapidly alternating magnetic field, which is arranged to penetrate the object to be heated, in this case a heating element in a flavor delivery device. The magnetic field generates eddy currents in the conductive material, and this flowing current generates heat via the resistance of the material. Hence, induction heating also requires current flow to generate heat from a material's electrical resistance, but the current is an eddy current generated by an external magnetic field, rather than a current obtained by a potential difference applied from an electrical power supply.

Accordingly, the configuration of a heating element with electrical contacts that make an electrical connection to an electrical power source such as a battery may be replaced by a heating element positioned within magnetic field range of an electromagnet driven by an associated electronic oscillator, which receives electrical power from a battery or other electrical power source. The examples discussed above include electrical contacts for the heating element; in inductive heating examples such physical contacts are not required, and the connection between the heating element and the power source is provided by the oscillator and electromagnet (or other arrangement for generating the required magnet field). The provision of electrical power to the heating element comprises application of a magnetic field to produce eddy currents, in place of the direct current flow through a physical electrical connection that provides electrical power in the resistive heating examples. In configurations which include more than one heating element, the magnetic field generation may be segmented (by providing an electromagnet per heating element, for example) so that the heating elements can be powered individually by operation of the corresponding electromagnet.

The various embodiments described herein are presented only to assist in understanding and teaching the claimed features. These embodiments are provided as a representative sample of embodiments only, and are not exhaustive and/or exclusive. It is to be understood that advantages, embodiments, examples, functions, features, structures, and/or other aspects described herein are not to be considered limitations on the scope of the invention as defined by the claims or limitations on equivalents to the claims, and that other embodiments may be utilized and modifications may be made without departing from the scope of the claimed invention. Various embodiments of the invention may suitably comprise, consist of, or consist essentially of, appropriate combinations of the disclosed elements, components, features, parts, steps, means, etc., other than those specifically described herein. In addition, this disclosure may include other inventions not presently claimed, but which may be claimed in future.

The invention claimed is:

1. A flavor delivery device for adding flavor to an aerosol stream generated by a smoking article, the device comprising:

an electrical heating element configured for connection to an electrical power source;

a support member in or on which the electrical heating element is supported, the support member also supporting electrical contacts configured to connect the electrical heating element to an electrical power source housed in an electronic aerosol provision system or smoking article holder, wherein the support member is planar; and one or more portions of flavorant provider arranged on each of opposite planar surfaces of the support member and wherein each of the one or more portions of flavorant provider arranged on each of opposite surfaces of the support member is arranged to receive heat from the electrical heating element, the one or more portions of flavorant provider comprising flavorant material held in a substrate material, the flavorant material able to form a vapor and the substrate material softenable under the application of heat, wherein provision of electrical power to the electrical heating element delivers heat to the one or more portions of flavorant provider to soften at least a part of the substrate material and release at least some of the flavorant material as a vapor.

2. The flavor delivery device according to claim 1, wherein the smoking article is a combustible smoking article and the flavor delivery device is configured to be provided in a holder for the combustible smoking article, the holder comprising the electrical power source.

3. The flavor delivery device according to claim 1, wherein the smoking article is an electronic aerosol provision system comprising the electrical power source, and the flavor delivery device is configured to be provided in the electronic aerosol provision system.

4. The flavor delivery device according to claim 1, wherein in which the electrical heating element is configured for provision of electrical power by induction.

5. The flavor delivery device according to claim 1, further comprising one or more further electrical heating elements configured to be individually provided with electrical power.

6. The flavor delivery device according to claim 5, comprising a separate portion of flavorant material arranged to receive heat from each electrical heating element.

7. The flavor delivery device according to claim 1, wherein the substrate material comprises a wax material.

8. The flavor delivery device according to claim 1, wherein the provision of electrical power to the electrical heating element to soften at least a part of the substrate material comprises providing electrical power to deliver sufficient heat to melt the at least a part of the substrate material.

9. The flavor delivery device according to claim 1, further comprising a computer processor configured to execute computer code stored in a memory to control the provision of electrical power to the electrical heating element, and a data transceiver configured to receive updated computer code for storage in the memory.

10. A flavor delivery device for adding flavor to an inhalable airstream generated by an electronic cigarette, the device comprising:

a support member, wherein the support member is planar;

an electrical heating element on the support member;

electrical contacts on the support member configured to make electrical connection between the electrical heating element and a battery in the electronic cigarette when the flavor delivery device is inserted into the electronic cigarette; and one or more portions of flavorant provider arranged on each of opposite planar surfaces of the support member over the electrical heating element, wherein each of the one or more portions of flavorant provider arranged on each of opposite surfaces of the support member is arranged to receive heat from the electrical heating element, the one or more portions of flavorant provider comprising flavorant material held in a matrix material, the flavorant material able to form a vapor and the matrix material able to melt when heated;

wherein the supply of electrical power to the electrical heating element provides heat to the flavorant material to melt the matrix material and release flavorant provider vapor therefrom.

* * * * *